US012657521B1

(12) United States Patent
Badam et al.

(10) Patent No.: US 12,657,521 B1
(45) Date of Patent: Jun. 16, 2026

(54) SYSTEM AND METHOD FOR TRANSITIONING FROM LARGE LANGUAGE MODELS TO SPECIALIZED MACHINE LEARNING MODELS

(71) Applicant: Adopt AI Inc., San Jose, CA (US)

(72) Inventors: Anirudh Badam, Issaquah, WA (US); Vijay Sagar Gullapalli, Campbell, CA (US); Pratyush Kumar Behera, San Jose, CA (US); Deepak Anchala, San Jose, CA (US); Rahul Bhattacharya, San Jose, CA (US)

(73) Assignee: ADOPT AI INC., San Jose, CA (US)

( * ) Notice: Subject to any disclaimer, the term of this patent is extended or adjusted under 35 U.S.C. 154(b) by 0 days.

(21) Appl. No.: 19/275,181

(22) Filed: Jul. 21, 2025

Related U.S. Application Data

(63) Continuation-in-part of application No. 19/250,608, filed on Jun. 26, 2025, and a continuation-in-part of application No. 19/175,972, filed on Apr. 10, 2025, now Pat. No. 12,430,227.

(51) Int. Cl.
G06N 20/00 (2019.01)

(52) U.S. Cl.
CPC .................................... G06N 20/00 (2019.01)

(58) Field of Classification Search
CPC .................................................... G06N 20/00
See application file for complete search history.

(56) References Cited

U.S. PATENT DOCUMENTS

| | | | |
|---|---|---|---|
| 2022/0180241 A1* | 6/2022 | Song | G06N 5/01 |
| 2022/0343210 A1* | 10/2022 | Lee | G06N 20/20 |
| 2024/0005479 A1* | 1/2024 | Wang | G16H 15/00 |
| 2024/0242091 A1* | 7/2024 | Dalibard | G06N 3/0464 |

(Continued)

OTHER PUBLICATIONS

Lakha, Javid, Minlan Yu, and Rana Shahout. "Faster, Cheaper, Just as Good: Cost-and Latency-Constrained Routing for LLMs." Sparsity in LLMs (SLLM): Deep Dive into Mixture of Experts, Quantization, Hardware, and Inference. (Year: 2025).*

(Continued)

*Primary Examiner* — Sehwan Kim
(74) *Attorney, Agent, or Firm* — Jason A. Smith; Shumaker, Loop & Kendrick, LLP

(57) ABSTRACT

The present disclosure provides a computer-implemented method for reducing latency by transitioning from a Large Language Model (LLM) to a specialized Machine Learning model for performing operations within an application. The method includes receiving a user instruction specifying an operation, executing the operation based on LLM output, determining a performance metric for the LLM, identifying a specialized Machine Learning model, training the specialized model using stored data, deploying the specialized model within a software development kit, and redirecting subsequent instructions to the specialized model. The training process involves building a labeled dataset mapping user instruction to API calls or parameter sets and initializing the specialized model with pre-trained or random parameters. The method enables efficient handling of application-specific tasks by leveraging the initial capabilities of the LLM and subsequently transitioning to more focused, specialized models for improved performance.

16 Claims, 5 Drawing Sheets

(56)                 References Cited

U.S. PATENT DOCUMENTS

| | | | | |
|---|---|---|---|---|
| 2024/0283820 | A1* | 8/2024 | Kochman | ............ G06N 3/0985 |
| 2024/0303503 | A1* | 9/2024 | Everett | .................. G06N 3/045 |
| 2024/0346254 | A1 | 10/2024 | Liu et al. | |
| 2025/0045023 | A1 | 2/2025 | Chakhvadze et al. | |
| 2025/0202762 | A1* | 6/2025 | Izquierdo Franco | ........................ |
| | | | | H04L 43/067 |
| 2025/0218428 | A1 | 7/2025 | Zaremoodi et al. | |
| 2025/0247414 | A1* | 7/2025 | Baragaba | ............ H04L 63/1433 |

OTHER PUBLICATIONS

Gholami, Sia, and Marwan Omar. "Can a student large language model perform as well as its teacher?." Innovations, Securities, and Case Studies Across Healthcare, Business, and Technology. IGI Global Scientific Publishing, 2024. 122-139. (Year: 2024).*

Fang, Chenhao, et al. "LIm-ensemble: Optimal large language model ensemble method for e-commerce product attribute value extraction." Proceedings of the 47th International ACM SIGIR Conference on Research and Development in Information Retrieval. 2024. (Year: 2024).*

MacDonald, Kincaid, et al. "Binary Malware Attribution using LLM Embeddings and Topological Data Analysis." (2024). (Year: 2024).*

* cited by examiner

500

SYSTEM AND METHOD FOR TRANSITIONING FROM LARGE LANGUAGE MODELS TO SPECIALIZED MACHINE LEARNING MODELS

PRIORITY INFORMATION

This application is a continuation-in-part of U.S. application Ser. No. 19/175,972, filed on 10 Apr. 2025, and U.S. application Ser. No. 19/250,608, filed on 26 Jun. 2025. The disclosures of both prior applications are hereby incorporated by reference in their entirety.

FIELD OF INVENTION

The present disclosure relates to integrating large language models with applications, and more particularly to transitioning from large language models to specialized machine learning models for performing operations within an application to reduce latency.

BACKGROUND

Large language models (LLMs) have demonstrated remarkable capabilities in natural language processing and generation tasks. These models can be integrated with various applications to enable complex workflows and operations based on user instructions. However, utilizing LLMs for routine, high-volume tasks within applications can present challenges related to latency, cost-efficiency, and resource utilization.

The integration of LLMs with application programming interfaces (APIs) allows for the execution of specified workflows based on user instructions. While this approach facilitates rapid experimentation and implementation of new features, it may not be optimal for long-term production use, particularly for frequently performed operations.

One technical challenge in using LLMs for application-specific tasks is the computational overhead associated with processing each user instruction through a fine-tuned domain specific LLM. This can result in increased latency and higher operational costs, especially as the volume of user interactions grows. Additionally, LLMs may not be optimized for domain-specific tasks, potentially leading to suboptimal performance for certain operations.

A key limitation of Large Language Models (LLMs) is their lack of repeatability. While LLMs can generate impressive outputs in response to user instructions, the results can vary each time the model is used, even with identical inputs. This variability arises because LLMs are inherently probabilistic, meaning that their outputs can differ each time they process the same data. In contexts where predictable and consistent results are crucial—such as in business applications where high-volume tasks need to be executed efficiently—this lack of repeatability becomes a significant drawback. As a result, LLMs can be inefficient for tasks that require a high degree of consistency, such as task automation and data processing, where repeated operations should yield the same outcome every time. This issue makes LLMs less suitable for scaling operational workflows in dynamic production environments, where predictability and repeatable performance are essential.

Current solutions often involve manually developing specialized models or rule-based systems for specific tasks. Further, maintaining separate systems for general language understanding and specific task execution can increase complexity and development overhead.

There is a need for a technical solution that can leverage the broad capabilities of LLMs while addressing the challenges of latency, cost, and performance for specific, frequently performed operations within applications. Such a solution would ideally combine the flexibility of LLMs with the efficiency of specialized models, enabling a seamless transition between the two as usage patterns emerge and stabilize.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a computer-implemented method for reducing latency and improving repeatability in executing a set of operations within an application is provided. The method comprises receiving an input dataset comprising relationships between initial user instructions and corresponding outputs generated by a Large Language Model (LLM), and results of executing the outputs on the application. The input dataset is gathered during processing of the initial user instructions by the LLM to generate outputs that cause the application to execute the set of operations. The method further comprises identifying, from a plurality of pre-stored Machine Learning (ML) models, an ML model configured to replicate outputs generated by the LLM that cause the application to execute the set of operations. The method comprises training the ML model using one or more portions of the input dataset, wherein the training is configured to enable the ML model to map user instructions to corresponding application programming interface (API) calls or parameter sets for performing the set of operations on the application. The method comprises processing, in parallel, a subsequent first set of user instructions associated with the set of operations: (i) using the LLM to generate a first output corresponding to each user instruction of the subsequent first set of user instructions; and (ii) using the trained ML model to generate a second output corresponding to each user instruction of the subsequent first set of user instructions. The method comprises determining an accuracy metric of the ML model comprising an error rate and a computational resource utilization associated with the first output and the second output over a predefined period. The error rate is calculated as a ratio of a number of the subsequent first set of user instructions for which an output generated by the ML model differs from a corresponding output generated by the LLM to a total number of the subsequent first set of user instructions. The computational resource utilization is a resource utilization associated with generation of the first output and the second output. The method comprises retraining the ML model in response to the accuracy metric of the ML model failing to satisfy a predefined accuracy threshold. The method comprises offloading a processing load for a subsequent second set of user instructions; associated with the set of operations, from the LLM to the ML model in response to the accuracy metric of the ML model satisfying the predefined accuracy threshold. The offloading comprises routing execution of one or more repeatable set of operations to the ML model from the LLM, thereby reducing computational load on the LLM, improving output repeatability, and reducing latency for performing a specific operation within the application.

According to other aspects of the present disclosure, the method may include one or more of the following features. Identifying the ML model may further comprise initializing the ML model for a specific operation by seeding random sets of weights to its parameters, thereby creating a plurality of candidate ML model instances. Each pre-stored model of the plurality of pre-stored ML models may be associated with a distinct set of operational capabilities. The input dataset may comprise the initial user instructions for the set of operations supported by the application, the corresponding outputs generated by the LLM, each output of the corresponding outputs comprising an API call or a parameter set for performing the set of operations on the application executing a respective operation, and a result of executing each of the set of operations on the application based on an LLM generated output. Training the ML model may use stored data to replicate an operation performed by the LLM. wherein training the ML model may further comprise simultaneously processing the subsequent second set of user instructions with both the LLM and the ML model. initially using an output from the LLM and discarding an output from the ML model, as the ML model exhibits an accuracy metric being higher than the predefined accuracy threshold during deployment stages. Training the ML model may further comprise applying an optimization algorithm to minimize an operation-specific loss function, wherein the optimization algorithm iteratively updates ML model parameters using batches of labeled data. Training the ML model may further comprise validating an NE model performance against at least one subset of stored data to measure accuracy in replicating operation performed by the LLM. Training the ML model may further comprise refining at least one hyperparameter of the ML model using a hyperparameter search process that utilizes performance metrics from validation subset. Performing hyperparameter tuning may include receiving a recommendation from the LLM regarding a hyperparameter value. and validating the recommendation using a performance metric derived from a validation subset. Deploying the ML model in a Software Development Kit (SDK) mat comprise providing a containerized instance of the ML model and configuring a runtime environment to handle the subsequent second set of user instructions without invoking the LLM.

According to another aspect of the present disclosure. a system for reducing latency and improving repeatability in executing a set of operations within an application is provided. The system comprises a memory storing one or more instructions and a processor coupled to the memory. The processor is configured to execute the one or more instructions for receiving an input dataset comprising relationships between initial user instructions and corresponding outputs generated by a Large Language Model (LLM), and results of executing the outputs on the application. The input dataset is gathered during processing of the initial user instructions by the LLM to generate outputs that cause the application to execute the set of operations. The processor is configured to execute the one or more instructions for identifying, from a plurality of pre-stored Machine Learning ML models an ML model configured to replicate outputs generated by the LLM that cause the application to execute the set of operations. The processor is configured to execute the one or more instructions for training ML model using one or more portions of the input dataset, wherein the training is configured to enable the ML model to map user instructions to corresponding application programming interface (API) calls or parameter sets for performing the set of operations on the application. The processor is configured to execute the one or more instructions for processing, in parallel, a subsequent first set of user instructions associated with the set of operations: (i) using the LLM to generate a first output corresponding to each user instruction of the subsequent first set of user instructions; and (ii) using the trained ML model to generate a second output corresponding to each user instruction of the subsequent first set of user instructions. The processor is configured to execute the one or more instructions for determining an accuracy metric of the ML model comprising an error rate and a computational resource utilization associated with the first output and the second output over a predefined period. The error rate is calculated as a ratio of a number of the subsequent first set of user instructions for which an output generated by the ML model differs from a corresponding output generated by the LLM to a total number of the subsequent first set of user instructions. The computational resource utilization is a resource utilization associated with generation of the first output and the second output. The processor is configured to execute the one or more instructions for retraining the ML model in response to the accuracy metric of the ML model failing to satisfy a predefined accuracy threshold. The processor is configured to execute the one or more instructions for offloading a processing load for a subsequent second set of user instructions. associated with the set of operations, from the LLM to the ML model in response to the accuracy metric of the ML model satisfying the predefined accuracy threshold. The offloading comprises routing execution of one or more repeatable set of operations to the ML model from the LLM, thereby reducing computational load on the LLM, improving output repeatability. and reducing latency for performing a specific operation within the application.

According to other aspects of the present disclosure, the system may include one or more of the following features. Identifying the ML model may further comprise initializing the ML model for a specific operation by seeding random sets of weights to its parameters, thereby creating a plurality of candidate ML model instances. Each pre-stored ML model of the plurality of pre-stored ML models may be associated with a distinct set of operational capabilities. The input dataset may comprise the initial user instructions for the set of operations supported by the application, the corresponding outputs generated by the LLM, each output of the corresponding outputs comprising an API call or a parameter set for performing the set of operations on the application executing a respective operation, and a result of executing each of the set of operations on the application based on an LLM generated output. Training the ML model may use stored data to replicate an operation performed by the LLM, wherein training the ML model may further comprise simultaneously processing the subsequent second set of user instructions with both the LLM and the ML model, initially using an output from the LLM and discarding an output from the ML model, as the ML model exhibits an accuracy metric being higher than the predefined threshold during deployment stages. Training the ML model may further comprise applying an optimization algorithm to minimize an operation-specific loss function, wherein the optimization algorithm iteratively updates ML model parameters using batches of labeled data. Training the ML model may further comprise validating an ML model performance against at least one subset of stored data to measure accuracy in replicating operation performed by the LLM. Training the ML model may further comprise refining at least one hyperparameter of the ML model using a hyperparameter search process that utilizes performance metrics from validation subset. Performing hyperparameter tuning may include receiving a recommendation from the LLM regarding a hyperparameter value, and validating the recommendation using a performance metric derived from a validation subset. Deploying the ML model in a Software Development Kit (SDK) may comprise providing a containerized instance of the ML model and configuring a runtime environment to handle incoming user instructions without invoking the LLM.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

Figure 1:
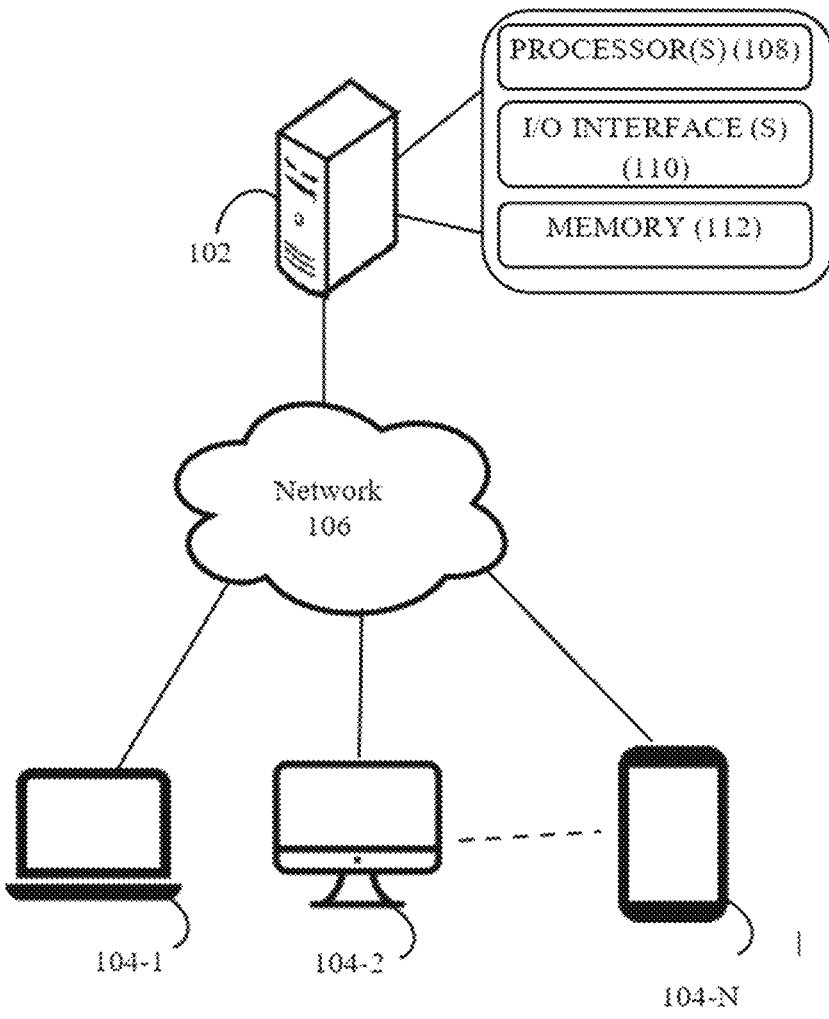
FIG. 1 illustrates a network system for transitioning from large language models to specialized machine learning models, according to aspects of the present disclosure.

Referring now to FIG. 1, a network system 100 may be implemented for transitioning from large language models to specialized machine learning models. The network system 100 may include a system 102 comprising one or more processors 108 and a memory storage 112 storing instructions that, when executed by the one or more processors 108, cause the system 102 to perform various operations.

The system 102 may include an LLM Integration Engine that interfaces with application programming interface (API) endpoints and serves as an initial logic layer for executing tasks. In some cases, the LLM Integration Engine receives user requests, processes them using a fine-tuned domain specific large language model (LLM), and orchestrates corresponding API calls and workflows.

A Performance Analysis Module may be included in the system 102 to monitor outputs generated by the LLM over a predefined operational window. The Performance Analysis Module may collect metrics such as accuracy, response time, success/failure rates of workflows, and resource utilization. In some cases, the Performance Analysis Module maintains a performance repository that logs user prompts, LLM outputs, and final actions triggered in the target application.

The system 102 may also include an ML Model Selection Module that evaluates data gathered by the Performance Analysis Module. The ML Model Selection Module may identify specific subsets of the LLM's tasks most amenable to specialized machine learning (ML) models. In some cases, the ML Model Selection Module proposes candidate ML models suited for automating these subsets.

A Model Training Engine may be part of the system 102. The Model Training Engine may extract historical data on user prompts, LLM outputs, and corresponding API calls that were executed successfully. In some cases, the Model Training Engine prepares training datasets specific to each workflow or API call. The Model Training Engine may train the identified ML model(s) to replicate or improve upon the LLM-generated actions.

The system 102 may include a Hyperparameter Optimization Module that leverages the LLM's high-level insights on hyperparameter selection to refine model configurations for each specific workflow. In some cases, the Hyperparameter Optimization Module iteratively tests different configurations, monitoring performance metrics in a validation environment.

A Deployment and Orchestration Framework may be included in the system 102 to manage versioning and deployment of ML models to the production environment. The Deployment and Orchestration Framework may monitor model performance post-deployment, comparing metrics against baseline LLM performance. In some cases, the Deployment and Orchestration Framework automatically routes new API calls to the deployed ML models once confidence thresholds are met.

The system 102 may retain fallback to the LLM for unhandled or newly emerging tasks. This approach allows the network system 100 to maintain flexibility while transitioning to more specialized ML models for well-defined tasks.

The network system 100 may receive a user instruction specifying at least one operation from a set of operations supported by the application. In some cases, the user instruction may be a natural language command or query entered by a user through an interface of the application. The system 102 may process this user instruction to determine which operation or operations from the supported set should be executed.

A Software Development Kit (SDK) may be integrated with the application running on the network system 100. The SDK may store data describing the set of operations supported by the application. This data may include information such as operation names, required parameters, expected outputs, and any constraints or limitations associated with each operation. In some cases, the SDK may maintain a registry or database of supported operations, allowing for easy lookup and validation of user-requested operations.

The memory storage 112 of the system 102 may contain the SDK and its associated data. When a user instruction is received, the system 102 may access this stored data to interpret the instruction and map it to the appropriate supported operation or operations.

For example, a user instruction might be "Generate a sales report for Q3." The system 102 may analyze this instruction and determine that it corresponds to a "generate report" operation supported by the application. The SDK data may specify that this operation requires parameters such as report type and time, which the system 102 can extract from the user instruction.

In some cases, the set of supported operations may include data manipulation tasks, such as filtering, sorting, or aggregating data. Other supported operations may involve more complex processes like generating visualizations, performing predictive analytics, or executing specific business logic.

The SDK may also store metadata about each operation, such as typical execution time, resource requirements, or usage frequency. This information may be used by the system 102 to optimize operation execution and resource allocation.

By maintaining a well-defined set of supported operations through the SDK, the network system 100 may provide a structured framework for handling user instructions while allowing for flexibility in how those instructions are expressed. This approach may enable the system 102 to efficiently interpret and execute a wide range of user requests within the capabilities of the application.

The network system may execute the specified operation on the application based on an output generated by a Large Language Model (LLM). In some cases, the LLM may analyze the user instruction to generate the output.

The system may process the user instruction through the LLM to interpret the intent and extract relevant details. For example, if a user instruction states, "Generate a bar chart showing monthly sales for the past year", the LLM may analyze this text to determine that a data visualization operation is required, specifically a bar chart, with sales data aggregated by month for a 12-month period.

In some cases, the LLM may generate an output that includes structured information about the requested operation. This output may contain details such as the operation type, required parameters, data sources, and any specific formatting or display preferences. For the bar chart example, the LLM output may specify:

1. Operation: Generate visualization
2. Chart type: Bar chart
3. Data: Monthly sales
4. Time range: Past 12 months
5. X-axis: Months
6. Y-axis: Sales figures The system may then use this structured output to execute the appropriate operation within the application. In some cases, the system may map the LLM output to specific API calls or function invocations supported by the application.

For more complex instructions, the LLM may break down the request into multiple steps or sub-operations. For instance, if a user asks to "Analyze customer feedback from the last quarter and create a summary report with key insights", the LLM may generate an output that outlines a series of operations:

1. Retrieve customer feedback data for the specified time
2. Perform sentiment analysis on the feedback
3. Identify common themes or topics
4. Generate statistical summaries
5. Compile insights into a report format The system may then execute these operations sequentially, using the output of each step as input for the next, ultimately producing the requested summary report.

In some cases, the LLM may also provide additional context or suggestions that can enhance the execution of the operation. For example, it may recommend specific data visualization techniques based on the nature of the data or suggest relevant metrics to include in an analysis report.

The memory storage of the system may contain predefined templates or operation workflows that the LLM can reference and customize based on the user instruction. This approach may allow for efficient execution of common operations while still providing flexibility to handle unique or complex requests.

By leveraging the LLM's natural language understanding and generation capabilities, the network system may effectively bridge the gap between user instructions expressed in natural language and the structured operations supported by the application. This process may enable users to interact with the application using intuitive, conversational commands while still benefiting from the application's full range of functionalities.

The network system may determine a performance metric associated with the Large Language Model (LLM) by evaluating the user instruction, the output generated by the LLM, and the result of executing the operation on the application. This evaluation process may involve multiple steps and criteria to assess the LLM's effectiveness and efficiency.

In some cases, the system may calculate an error rate associated with the LLM's performance. The error rate may be determined by comparing the LLM's output to the actual results of executing the operation. For example, if the LLM generates an output that leads to an incorrect API call or parameter set, this may be counted as an error. The system may track these errors over a predefined period, such as a day, week, or month, to establish a comprehensive error rate.

The system may also measure the execution cost associated with using the LLM. This cost may include computational resources consumed, processing time, and any external API calls required. In some cases, the execution cost may be quantified in terms of CPU cycles, memory usage, or even monetary cost if cloud resources are utilized.

The network system may calculate these metrics—error rate and execution cost—over a predefined period. This period may be adjustable based on the specific needs of the application, or the volume of user instructions processed. For instance, in a high-traffic application, the system may calculate these metrics hourly, while in less frequently used applications, daily or weekly calculations may be sufficient.

Once the error rate and execution cost have been calculated, the system may compare these metrics against predefined cost-efficiency thresholds. These thresholds may represent acceptable levels of performance for the LLM in the context of the specific application. For example, a threshold might specify that the error rate should not exceed 5% and the execution cost should remain below a certain value per operation.

In some cases, the system may use a composite score that combines multiple performance metrics. This score may weigh different factors based on their importance to the application. For instance, in time-sensitive operations, the execution time may be given more weight than the error rate.

The memory storage of the system may contain historical performance data, allowing for trend analysis and comparison of current performance against past benchmarks. This historical context may help in identifying gradual degradation or improvement in the LLM's performance over time.

The network system may also consider the complexity of user instructions when evaluating performance. More complex instructions may have different performance expectations compared to simpler ones. The system may categorize instructions based on complexity and apply different thresholds or evaluation criteria accordingly.

In some cases, the system may employ a feedback loop where the results of performance metric determination influence future processing of user instructions. For example, if the LLM consistently performs poorly on certain types of instructions, the system may flag these for review or alternative processing methods.

By systematically determining and analyzing these performance metrics, the network system may gain valuable insights into the LLM's effectiveness in handling user instructions and executing operations within the application. This information may guide decisions about when to transition from the LLM to more specialized machine learning models for specific tasks, ensuring optimal performance and resource utilization.

The network system may identify a specialized Machine Learning model based on the performance metric associated with the Large Language Model (LLM). In some cases, this identification process may involve multiple steps to ensure the selection of an appropriate model for the specific operation.

The system may extract features from the stored data in the memory storage. These features may include textual embeddings of the user instruction, which represent the semantic meaning of the instruction in a numerical format. In some cases, the system may use techniques such as word embeddings or sentence embeddings to generate these representations.

The extracted features may also include metadata of the requested operation. This metadata may contain information such as the operation type, input parameters, expected output format, and any specific constraints or requirements associated with the operation. In some cases, the metadata may be stored alongside the operation definitions in the Software Development Kit (SDK) integrated with the application.

Additionally, the system may extract success or failure outcomes of previous executions of the operation. These outcomes may provide valuable historical data on the performance of different models or approaches for similar operations.

In some cases, the network system may select at least one candidate model architecture from a library of models. This selection may be based on several criteria, including the requirement of the operation type, a latency constraint, and an accuracy threshold. For example, if the operation requires natural language processing, the system may prioritize models specifically designed for text analysis tasks.

The latency constraint may be a predefined maximum response time acceptable for the operation. The system may filter out model architectures that typically exceed this time limit. Similarly, the accuracy threshold may represent the minimum acceptable level of performance for the model. The network system may only consider models that have demonstrated the ability to meet or exceed this threshold in similar tasks.

In some cases, the system may apply a resource feasibility check to confirm that a selected model architecture can operate within a predefined memory and computational budget. This check may involve analyzing the model's size, computational requirements, and typical resource usage patterns. The network system may compare these requirements against the available resources to ensure the model can be efficiently deployed and operated within the existing infrastructure.

The system may finalize the specialized Machine Learning model by verifying resource availability and ensuring compatibility with a hyperparameter optimization routine. This verification process may involve checking that sufficient computational resources are available for both training and inference stages of the model. In some cases, the system may also confirm that the model is compatible with existing optimization libraries or frameworks used in the application.

In some cases, the network system may leverage the LLM's interpretive capabilities to assess Machine Learning model architectures or hyperparameters likely to excel in replicating specific workflows. This approach may involve using the LLM's meta-learning or zero-shot analysis capabilities to provide insights into potentially effective model configurations for the given task.

For example, if the operation involves sentiment analysis of customer reviews, the LLM may suggest that a transformer-based architecture with specific attention mechanisms might be well-suited for the task. The network system may then prioritize models with these characteristics in its selection process.

By following this comprehensive identification process, the network system may select a specialized Machine Learning model that is well-suited to the specific operation, meets performance requirements, and can be efficiently deployed within the existing infrastructure. This approach may allow for the gradual transition from the fine-tuned domain specific LLM to more specialized and efficient models for frequently performed operations.

The network system may train the specialized Machine Learning model using the stored data to replicate the operation performed by the Large Language Model (LLM). In some cases, this training process may involve several steps to ensure the specialized model can effectively handle the specific tasks it is designed for.

The system may build a labeled training dataset that maps user instructions to an application programming interface (API) call or parameter set generated by the LLM. This dataset may serve as the foundation for training the specialized model. In some cases, the system may extract relevant information from the memory storage, which may contain historical data on user prompts, LLM outputs, and corresponding API calls that were executed successfully.

For example, if the specialized model is being trained to handle customer support ticket classification, the labeled dataset may include user queries as inputs and the corresponding ticket categories as outputs. In the case of a model designed for data visualization tasks, the dataset may consist of natural language requests for charts or graphs paired with the specific API calls or parameters needed to generate those visualizations.

The network system may initialize the specialized Machine Learning model with parameters selected from a pre-trained model or initialized using a random distribution. In some cases, using parameters from a pre-trained model may provide a beneficial starting point, especially if the pre-trained model has been exposed to similar types of data or tasks. Alternatively, initializing with a random distribution may be suitable when the task is highly specific or significantly different from existing pre-trained models.

The system may apply an optimization algorithm to minimize a task-specific loss function. This optimization process may involve iteratively updating model parameters using batches of the labeled data. In some cases, the system may employ techniques such as stochastic gradient descent or adaptive optimization methods like Adam or RMSprop to efficiently navigate the parameter space and find optimal values.

The network system may validate the specialized Machine Learning model performance against at least one subset of the stored data to measure accuracy in replicating the operation performed by the LLM. This validation process may involve using a held-out portion of the dataset that was not used during training. The system may compare the model's predictions on this validation set to the actual outputs generated by the LLM, calculating metrics such as accuracy, precision, recall, or mean squared error depending on the nature of the task.

In some cases, the system may employ data augmentation techniques and cross-validation processes for robust model creation. Data augmentation may involve creating additional training examples by applying transformations or perturbations to existing data points. Cross-validation may help assess the model's performance across different subsets of the data, providing a more reliable estimate of its generalization capabilities.

The network system may refine at least one hyperparameter of the specialized Machine Learning model using a hyperparameter search process that utilizes performance metrics from the validation subset. This refinement process may involve techniques such as grid search, random search, or more advanced methods like Bayesian optimization to explore different hyperparameter configurations and identify those that yield the best performance.

In some cases, the system may receive a recommendation from the LLM regarding a hyperparameter value. The LLM may leverage its broad knowledge base to suggest potentially effective hyperparameter settings based on the specific characteristics of the task and data. The network system may then validate this recommendation using a performance metric derived from the validation subset. For example, if the LLM suggests a particular learning rate for the optimization algorithm, the system may evaluate the model's performance using this learning rate and compare it to other values to determine its effectiveness.

By following this comprehensive training process, the network system may develop specialized Machine Learning models that are tailored to specific operations within the application. These models may offer improved efficiency and performance compared to the fine-tuned domain specific LLM for frequently performed tasks, while maintaining the flexibility to handle a wide range of user instructions.

The network system may deploy the specialized Machine Learning model within the software development kit (SDK) to perform the operation on subsequent user instructions. In some cases, the system may provide a containerized instance of the specialized Machine Learning model. This containerization approach may allow for efficient deployment and management of the model within the existing application infrastructure.

The system may configure a runtime environment to handle incoming user instructions without invoking the Large Language Model (LLM). This configuration may involve setting up appropriate routing mechanisms and integration points within the SDK. In some cases, the runtime environment may be designed to seamlessly switch between the LLM and the specialized model based on the type of incoming instruction.

The network system may redirect subsequent user instructions associated with the operation to the specialized Machine Learning model instead of the LLM. This redirection process may involve analyzing incoming instructions to determine if they match the patterns or types of operations that the specialized model has been trained to handle. In some cases, the system may use a decision-making algorithm to route instructions to the appropriate model based on factors such as instruction complexity, expected response time, and historical performance data.

For example, if the specialized model has been trained to handle customer support ticket classification, the system may redirect all incoming user instructions related to ticket categorization to this model. Similarly, for a specialized model trained in data visualization tasks, the system may route all chart and graph generation requests to this model instead of the LLM.

The memory storage may contain mapping information that associates specific types of user instructions or operations with the corresponding specialized models. The system may use this mapping to efficiently route incoming instructions to the appropriate model without the need for complex decision-making processes for each request.

In some cases, the network system may monitor the specialized Machine Learning model after deployment. This monitoring process may involve collecting logs of newly received text-based instructions and tracking various performance metrics. The system may analyze these logs to identify any shifts in user instruction patterns or emerging types of requests that the specialized model may not be equipped to handle.

The system may continuously evaluate the performance of the specialized model against predefined thresholds. These thresholds may include metrics such as response time, accuracy, or resource utilization. In some cases, if the performance metrics fall below a second predefined threshold, the network system may initiate a retraining process for the specialized Machine Learning model.

The retraining process may involve incorporating new data from the collected logs, adjusting model parameters, or even modifying the model architecture if necessary. In some cases, the system may temporarily route instructions back to the LLM while the specialized model undergoes retraining to ensure uninterrupted service.

By implementing this deployment and redirection approach, the network system may achieve a balance between the flexibility of the LLM and the efficiency of specialized models. This strategy may allow for continuous improvement and adaptation of the system's capabilities in handling user instructions across various operations supported by the application.

Referring now to FIG. 1, a network system 100 is disclosed that includes a system 102 for transitioning from large language models to specialized machine learning models. The system 102 may be accessed by multiple client devices, including a laptop client 104-1, a desktop client 104-2, and a mobile client 104-N, collectively referred to as client devices 104 hereinafter. The client devices 104 are communicatively coupled to the system 102 through a communication network 106.

Although the present disclosure describes the system 102 as implemented on a server, it may be understood that the system 102 may be implemented in a variety of computing systems, such as a laptop computer, a desktop computer, a workstation, a virtual environment, a mainframe computer, a network server, or a cloud-based computing environment. The system 102 may be accessed by multiple users through one or more client devices 104. Examples of the client devices 104 may include, but are not limited to, portable computers, personal digital assistants, handheld devices, and workstations.

The communication network 106 may be a wireless network, a wired network, or a combination thereof. The network 106 can be implemented as different types of networks, such as intranet, local area network (LAN), wide area network (WAN), the internet, and the like. The network 106 may use a variety of protocols, for example, Hypertext Transfer Protocol (HTTP), Transmission Control Protocol/ Internet Protocol (TCP/IP), Wireless Application Protocol (WAP), and the like, to facilitate communication between the system 102 and the client devices 104.

In one embodiment, the system 102 includes at least one processor 108, an input/output (I/O) interface 110, and a memory 112. The processor 108 may be implemented as one or more microprocessors, microcomputers, microcontrollers, digital signal processors, central processing units (CPUs), state machines, logic circuitries, and/or any devices that manipulate signals based on operational instructions. The processor 108 is configured to fetch and execute computer-readable instructions stored in the memory 112.

The I/O interface 110 may include a variety of software and hardware interfaces, for example, a web interface, a graphical user interface, and the like. The I/O interface 110 allows the system 102 to interact with users directly or through the client devices 104. Further, the I/O interface 110 enables the system 102 to communicate with other computing devices, such as web servers and external data servers. The I/O interface 110 can facilitate communications within a wide variety of networks and protocol types, including wired networks and wireless networks.

The memory 112 may include any computer-readable medium known in the art including, for example, volatile memory and non-volatile memory. The memory 112 may store routines, programs, objects, components, data structures, etc., which perform tasks or implement abstract data types. In one embodiment, the memory 112 serves as a repository for storing data processed, received, and generated by one or more of the programs or coded instructions.

The system 102 is designed to address various challenges in transitioning from large language models to specialized machine learning models for performing operations within applications. Users may access the system 102 via the I/O interface 110 using their client devices 104. The system 102 receives user instructions specifying operations supported by an application, executes these operations using a large language model, and then transitions to specialized machine learning models to reduce latency and improve efficiency for subsequent similar operations.

In one embodiment, the network system 100 may be implemented for topic classification operations within an application. The system 102 may receive user instructions to classify documents, APIs, or text content into topic categories. Initially, the LLM Integration Engine processes these classification requests using a large language model to generate topic assignments.

The Performance Analysis Module may monitor performance metrics including cost per classification operation and consistency of topic generation. The system 102 may determine that the LLM exhibits high operational costs and non-repeatable outputs, where identical input documents may receive different topic classifications across multiple runs.

Based on these performance metrics, the ML Model Selection Module may identify Latent Dirichlet Allocation (LDA) as a candidate specialized model architecture suitable for topic classification tasks. The system 102 may recognize that while LDA models offer repeatability and lower computational costs, they require careful parameter optimization for specific domains.

The Model Training Engine may generate multiple LDA model instances with different parameter configurations. In some cases, the system may initialize between 10 and 100 LDA model instances with varying weight parameters. The system 102 may evaluate each LDA model by running topic classification on the same corpus used by the LLM and comparing the generated topics using intersection metrics.

In an embodiment, the system 102 may implement a gradual transition approach where the specialized Machine Learning model and the Large Language Model operate simultaneously during a transition period. In some cases, the system 102 may route a portion of incoming user instructions to the specialized ML model while continuing to process the remaining instructions through the LLM. The Performance Analysis Module may continuously monitor the efficiency metrics of the specialized ML model, including accuracy, response time, and resource utilization, comparing these metrics against the LLM's performance.

During this parallel operation phase, the system 102 may incrementally increase the percentage of user instructions directed to the specialized ML model as its performance metrics improve. For example, the system may initially route 10% of instructions to the specialized model, then gradually increase to 25%, 50%, 75%, and eventually 100% as confidence thresholds are met. The system 102 may establish predefined efficiency thresholds that the specialized ML model must consistently exceed before full transition occurs.

Once the specialized Machine Learning model demonstrates efficiency metrics above the predefined threshold for a sustained period, the network system 100 may automatically disable the LLM for that specific operation type. In some cases, the system may maintain the LLM in a standby mode to handle edge cases or newly emerging instruction patterns that the specialized model cannot process effectively. This gradual transition approach may ensure service continuity while minimizing the risk of performance degradation during the model transition process.

In an embodiment, the system may implement a concurrent evaluation approach where both the specialized Machine Learning model and the Large Language Model process identical user instructions simultaneously. Initially, the system 102 may utilize only the LLM output while discarding the specialized ML model output, as the specialized model may exhibit high error rates during early deployment stages.

The Performance Analysis Module of the system may calculate an accuracy metric for the specialized ML model by comparing its outputs against the LLM outputs for each user instruction. The system 102 may determine the error rate as the ratio of requests where the specialized ML model output differs from the LLM output to the total number of incoming requests. In some cases, the system may establish accuracy thresholds, such as 95% agreement between the specialized model and LLM outputs.

As the specialized ML model accuracy improves beyond the predefined threshold, the network system 100 may gradually reduce the percentage of traffic processed by the LLM. For example, the system may initially route 100% of outputs from the LLM to the application, then progressively shift to using 90% LLM and 10% specialized model outputs, continuing this transition until the specialized model handles the majority of requests.

The system 102 may maintain the LLM in a monitoring capacity, processing a reduced percentage of incoming requests to provide ground truth data for continuous accuracy assessment and model retraining. This approach may enable the network system 100 to adapt to shifts in underlying data patterns, new customer domains, or evolving application requirements while ensuring consistent service quality during the transition period.

In one embodiment, the system is integrated with a project management platform to facilitate the automation of operations typically performed by users within the platform. Over time, as users interact with the system, the Large Language Model (LLM) learns from their instructions and actions, progressively building an understanding of the operations that can be performed on the application. This learning process is dynamic and helps the system determine which operations can be transitioned from the LLM to a specialized Machine Learning (ML) model to increase the certainty of execution and reduce operational costs.

Let us assume that the project management platform supports 10 application programming interfaces (APIs), each corresponding to 20 distinct operations that can be performed. For example, operations might include task creation, scheduling, resource allocation, and status updates. Initially, the LLM understands the workflows for each of these operations, including the sequence of actions required to execute them. The LLM's role is to process user input, generate output (such as API calls or actions), and execute operations in real-time, leveraging its understanding of the platform's operations.

Data Collection by LLM

As users interact with the LLM, the system collects critical data points for each operation performed, including:

User input: The instruction or request given by the user (e.g., "Create a task for John Doe" or "Schedule a meeting with the design team").

Output generated by the LLM: The set of operations (API calls, parameters, etc.) that the LLM generates to fulfill the user's request.

Result generated by the LLM: The outcome of executing the operation (e.g., successful creation of a task, updated task status, or meeting scheduled).

Each of these data points is stored separately for each operation. Over time, as more user interactions are processed, the LLM continuously gathers a rich dataset of input-output-result pairs that capture the operational behavior of the platform. This data is valuable because it contains both successful execution paths and edge cases, offering insights into how the system can be improved.

The method utilizes large language models (LLMs) to enhance automated machine learning (ML) processes by generating featurization approaches that significantly reduce latency and improve efficiency. The featurization process enables machine learning models to perform complex operations effectively and in real-time. The detailed approach is as follows:

Input Dataset and Initial User Instructions

The process begins by receiving an input dataset, which is gathered by the LLM. The LLM gathers this dataset by executing user instructions that direct the system to perform specific operations within the application. The input dataset is composed of various data points, such as parameters or quantities, derived from the user's requirements, which will be processed to generate useful features.

Featurization Generation by the LLM

Once the input dataset is acquired, the LLM generates multiple featurization approaches. Each approach defines a feature set, which is a collection of features derived from the relationships between user instructions and the LLM's generated outputs within the dataset. These feature sets serve as critical elements that reflect how different aspects of the input data interact and correlate, ensuring that the machine learning models can focus on the most relevant parts of the data.

Automated Featurization refers to a process employed to intelligently prepare training data for specialized Machine Learning (ML) models, thereby enhancing their ability to accurately replicate complex operational outputs previously generated by a Large Language Model (LLM). This process is executed by an automated featurization module, which leverages the analytical capabilities of an LLM or a similar dedicated intelligence, to move beyond manual, heuristic-driven feature engineering.

Specifically, the automated featurization module receives an input dataset comprising raw user instructions, the corresponding application programming interface (API) calls or parameter sets generated by the LLM in response to those instructions, and potentially the results of their execution. Rather than simply using the raw text of instructions or the direct API outputs, the LLM within this module analyzes semantic content and structural patterns embedded within both the user instructions and the LLM-generated outputs. This analysis allows the LLM to understand the underlying intent, context, and operational requirements.

Based on this deep understanding, the automated featurization module generates a plurality of distinct featurization approaches. Each featurization approach represents a sophisticated strategy for transforming the raw input data into a structured "feature set" that captures different types of relevant information. For instance, one approach might propose extracting semantic embeddings from the user instructions to capture intent, while another might focus on parsing the structure of the LLM-generated API calls to identify key parameters and their data types. The features derived from these approaches can include, but are not limited to, linguistic features (e.g., n-grams, part-of-speech tags, named entities, sentiment scores), contextual embeddings, structural representations (e.g., JSON pathing, parameter cardinality), and inferred relationships between elements in the instruction and the API call.

By providing multiple, intelligently proposed featurization approaches and their corresponding feature sets, the present invention significantly streamlines and optimizes the subsequent training of specialized ML models. This automated process ensures that the specialized ML models are trained on rich, predictive features that accurately represent the complex mapping between user instructions and desired application operations, which is critical for enabling them to achieve high similarity with LLM outputs and ultimately reduce execution latency.

In an automated featurization system, the type of features generated by the LLM (or automated featurization module) can be tailored or proposed specifically based on the characteristics of the data and the requirements of different downstream machine learning models. For instance, when preparing data for a Latent Dirichlet Allocation (LDA) model, the system might predominantly generate featurization approaches centered around n-grams (sequences of n words, e.g., "fast car" as a bigram) or TF-IDF vectors (Term Frequency-Inverse Document Frequency) to capture word importance and distribution, as these are highly effective for topic modeling. Conversely, for other specialized ML models, particularly those designed for natural language understanding or entity recognition, the featurization module could propose feature sets comprising named entities (e.g., extracting "Apple" as a company or "Tim Cook" as a person), Bag-of-Words (BoW) representations (counting word occurrences without considering order), semantic embeddings (dense vector representations capturing word meaning), or even part-of-speech tags (identifying nouns, verbs, adjectives) to provide richer linguistic context for the model. This dynamic and model-aware featurization ensures that each specialized ML model receives data in a format optimized for its task and architecture.

For generating featurization approaches, the LLM is trained on an enormous and diverse corpus of text and code data. This training allows it to develop a deep understanding of:

Semantics: The meaning and relationships between words, phrases, and concepts (e.g., "set alarm" implies a time).

Syntax and Structure: How natural language is constructed and how structured data (like code, JSON, XML) is organized.

Contextual Inference: The ability to infer the likely intent or domain from textual input.

Programmatic Patterns: How natural language instructions translate into logical steps or API calls (from observing vast amounts of code and documentation).

Prompt Engineering/Instruction Following: For specific task of generating featurization approaches, the automated featurization module interacts with the LLM through carefully constructed prompts. These prompts might present:

Examples of the raw user instructions and their corresponding LLM-generated API calls/parameters.

Instructions to the LLM to "analyze this data and suggest different ways to extract features that would be useful for a smaller ML model to predict the API calls from the instructions."

Specific constraints or types of features to consider.

In-Context Learning (Few-shot/Zero-shot): Due to the training, the LLM can often perform complex tasks like proposing featurization strategies based on a few examples (few-shot learning) or even no examples (zero-shot learning) provided directly in the prompt.

Fine-tuning: The LLM may be fine-tuned based on application specific data to generate better featurization strategies for specific application operations. This would involve showing the LLM examples of raw data inputs and the ideal feature sets or featurization rules derived from them.

Identifying Operations for ML Transition

After accumulating sufficient data, the LLM begins to analyze the interactions to determine which operations are most suitable for transition from the LLM to an ML-based solution. The decision is based on several factors, including:

Repetitiveness and predictability: Operations that have high frequency and well-defined patterns of execution are prime candidates for ML replication. For example, if creating tasks or scheduling meetings follows a predictable pattern, it might make sense to transition these operations to ML for more efficient processing.

Certainty and reliability: If the LLM's execution of certain operations consistently produces accurate results over time, the system identifies these operations as suitable for training an ML model to replicate them, thereby reducing the dependency on the LLM.

In this phase, the system evaluates the data collected to determine whether sufficient information has been gathered for an operation. The LLM checks if the data includes enough examples of user input, output parameters, and successful results to ensure that a machine learning model can accurately replicate the operation without the need for LLM intervention.

Training the ML Model

Once the system identifies an operation that can be transitioned to ML, it begins the process of training the specialized Machine Learning model to replicate the operation performed by the LLM. This is done by using the labeled data that has been captured by the LLM from previous user interactions. The machine learning model is an unsupervised learning model that incorporates techniques such as Latent Dirichlet Allocation (LDA), TF-IDF (Term Frequency-Inverse Document Frequency) based methods, and RAKE (Rapid Automatic Keyword Extraction) for tasks such as topic modeling, feature extraction, and keyword identification.

The training process involves:

Building the labeled dataset: The LLM compiles a set of user instructions paired with the corresponding API calls or parameter sets generated during previous interactions. This dataset becomes the training data for the ML model, which is used to teach the model how to handle future requests independently.

Training the ML model: The LLM initiates the training of the specialized ML model, utilizing the labeled data to adjust the ML model's parameters and teach it how to execute the operation based on the input instructions. The model is trained to perform the exact sequence of API calls, handle various data fields, and produce the same outcome as the LLM would, based on the historical data provided.

Fine-tuning and validation: The LLM monitors the training process, validating the accuracy of the ML model by comparing its outputs to those produced by the LLM. If necessary, the LLM adjusts the training process or introduces new data to ensure that the ML model can reliably perform the operation with minimal error.

System Operation with LLM and ML Models

The system utilizes both the Large Language Model (LLM) and a specialized Machine Learning (ML) model to execute user instructions. Initially, the system relies heavily on the LLM for both pre-processing user input and post-processing the generated output. The LLM is responsible for interpreting the user's natural language input, transforming it into a structured format that the ML model can process. This ensures that the ML model, which is generally not designed to handle natural language directly, can accurately execute operations based on the processed input.

As the system progresses, it monitors the accuracy and performance of the ML model relative to the LLM. The LLM continuously tracks the accuracy of the ML model by comparing its output to the LLM's output. As the ML model's performance improves—both in terms of accuracy and processing speed—the system gradually reduces its reliance on the LLM for operational execution. This allows the specialized ML model to handle more of the workload, improving overall system efficiency.

Gradual Reduction of LLM Reliance

Initially, for every user instruction, the LLM processes the input, converting it into a format that the specialized ML model can handle. Over time, as the ML model becomes more proficient, the system starts relying less on the LLM for heavy computation. Instead, the LLM's role becomes more focused on pre-processing user instructions and preparing structured input for the ML model. Once the ML model has processed the user instruction and executed the operation, the LLM's responsibility shifts to post-processing the output, transforming the ML model's results back into natural language and presenting it to the user.

This shift in responsibility ensures that the LLM's computational burden is reduced, as it no longer needs to perform the heavy lifting of executing operations. Instead, the LLM's tasks are limited to interpretation at the input stage and natural language presentation at the output stage. In this way, the system leverages the strengths of both models: the LLM's ability to understand and generate natural language and the ML model's ability to efficiently process structured tasks with greater speed and accuracy.

Importance of LLM in Input and Output Stages

It is important to note that the LLM plays a critical role in both the input and output stages of the system's workflow. Since the ML model typically cannot process raw natural language input effectively, the LLM is essential in interpreting user instructions and transforming them into a structured form that the ML model can understand. Likewise, the LLM is crucial at the output stage, where the ML model's results—which are usually structured data or technical outputs—are converted back into human-readable natural language, ensuring that the user receives meaningful and contextually appropriate feedback.

This hybrid approach, where the LLM and the ML model work in tandem, enables the system to gradually reduce latency and computational overhead by transitioning more operations to the ML model while retaining the LLM's natural language processing capabilities. The result is a more efficient system that benefits from the speed and accuracy of machine learning models while still preserving the human-centric interaction capabilities provided by the LLM.

In the present system, the Large Language Model (LLM) plays a central role in training, directing, and integrating outputs from multiple specialized Machine Learning (ML) models. This hybrid approach combines the flexibility and high-level abstraction capabilities of the LLM with the speed and efficiency of the ML models, reducing computational load and latency while maintaining high-quality outputs.

LLM's Role in Training and Selection of ML Models

The LLM is responsible for training multiple ML models to perform specific tasks based on the user's requirements. Over time, the LLM gathers data from user instructions and identifies patterns in the tasks being performed. For example, the system may train five different ML models, each specialized in a specific domain or operation, such as data classification, image processing, sentiment analysis, prediction, and optimization.

The LLM knows exactly what ML model needs to be selected based on the type of operation or user instruction. This is accomplished by analyzing the user input, understanding the context, and determining the most relevant model for the task. For instance, if the user asks for a predictive analysis based on historical data, the LLM would select a prediction ML model. If the task requires processing and classifying large datasets, the LLM may choose an optimization model.

The LLM is also responsible for understanding how to preprocess the input for each of the specialized ML models. Each ML model may require data to be formatted in a specific way, and the LLM can transform user input into the required format. This ensures that the correct input is provided to each model without the need for the user to worry about model-specific requirements. The LLM essentially acts as the orchestrator of the system, managing the flow of data between the user, the ML models, and the final output.

LLM's Role in Executing Complex Operations

Consider a complex operation that requires the use of five different ML models and the LLM. Here's how the system works:

User Input: The user provides an instruction, such as "Generate a detailed financial forecast based on the last 5 years of transaction data."

LLM Preprocessing: The LLM first interprets the instruction, identifies the relevant operations, and determines the appropriate ML models to execute the task. It then preprocesses the user input to match the specific requirements of each model. For example, the LLM might prepare the data for time-series analysis (for forecasting), categorical data classification (for identifying transaction categories), and sentiment analysis (for analyzing market sentiment).

Generating an Action Plan: The LLM creates an action plan comprising multiple partial tasks, each assigned to a different ML model. For example:

ML Model 1 might perform data cleaning and normalization.

ML Model 2 might perform predictive modeling for financial forecasts.

ML Model 3 could analyze transaction data to identify patterns.

ML Model 4 could run sentiment analysis based on market news.

ML Model 5 might optimize the final recommendation using optimization algorithms.

The action plan generated by the LLM defines the sequence (or parallel execution) of tasks across the models.

Execution of Operations: The LLM executes the action plan by instructing each ML model to process the data. The LLM generates the correct input for each model in the expected format and submits the data to the corresponding ML model for processing.

Stitching the Output: Once the ML models have executed their tasks, they return their respective results to the LLM. The LLM then aggregates the outputs from all models, ensuring that they are combined coherently. This process of stitching together the output might involve several steps, such as:

Merging numerical data from different models.

Aligning categorical outputs from classification tasks.

Integrating sentiment scores into a broader context.

The LLM ensures that the output is presented to the user in a human-readable natural language format, even if the data provided by the ML models was structured or technical in nature. For instance, the financial forecast might be returned as a comprehensive narrative that explains the forecast trends, insights from transaction data, and sentiment analysis conclusions.

LLM Reduces Computational Load

Initially, the LLM was responsible for performing all operations, including data processing, decision-making, and presenting outputs. However, the present system improves efficiency and reduces computational load by transitioning the responsibility for certain tasks to specialized ML models. This offloading significantly speeds up the process because ML models are better suited to handle specific computationally heavy, repeatable tasks with greater speed and lower cost.

Once the ML models are trained and ready to handle certain tasks, the LLM's role becomes focused on input pre-processing (ensuring data is in the right format for the ML model) and output presentation (transforming the technical or structured outputs of the ML models into human-readable natural language). This reduction in workload for the LLM leads to lower latency and higher throughput, making the system more scalable and cost-efficient.

Example of System in Action

Consider a user who requests, "Generate a report on last quarter's marketing campaigns." The system processes the instruction as follows:

The LLM interprets the instruction, identifies the operations needed, and selects the appropriate models (e.g., a classification model for campaign data, an analysis model for performance tracking, and a summarization model for the final report).

The LLM preprocesses the user input for the models and sends it for execution.

Each ML model processes its task in parallel:

Model 1 classifies the campaigns by performance.

Model 2 performs data analysis to identify trends.

Model 3 generates a summary of the results.

The LLM stitches the results together into a coherent report, ensuring the output is understandable and presents the information effectively.

Finally, the LLM presents the output in natural language to the user, e.g., "The last quarter's marketing campaigns showed a 15% increase in engagement, with the social media campaigns performing 20% better than email campaigns."

In this system, when the user provides an instruction such as "Generate and send a report on the sales performance for last quarter," the Large Language Model (LLM) processes the user's request and generates an action plan. The LLM identifies that the task involves multiple operations, each of which can be handled by different components of the system. The LLM first generates Step A: an API call to retrieve sales data for the last quarter from the database, as this is a straightforward task that doesn't require complex processing.

However, the LLM identifies that Step B, which involves analyzing sales trends and identifying top-performing products, and Step C, which involves summarizing the key findings of the sales data, are more complex operations that require machine learning (ML) capabilities. Since ML models are more efficient at handling these data-heavy tasks, the LLM directs the system to use the specialized ML model for these steps. Specifically, the LLM preprocesses the user input, formats the sales data for the ML model, and instructs the ML model to execute Steps B and C, where the ML model analyzes the data and generates a summary of the findings.

While the ML model handles Steps B and C, the LLM itself executes Step A by calling the API to retrieve the required sales data from the database. Once the ML model completes its tasks, it returns the analysis and summary to the LLM. The LLM then aggregates the results—combining the data retrieved in Step A with the output from the ML model—and formats this information into a final report. The final output, which includes insights into sales performance and identifies the top-performing products, is then presented to the user in a natural language format.

This process illustrates the hybrid approach where the LLM and ML model work together to optimize the execution of complex tasks. Initially, the LLM is responsible for all steps, but over time, as the ML model becomes capable of performing repetitive, data-intensive tasks with higher speed and accuracy, the LLM's computational load is reduced. The LLM's role transitions to pre-processing the user input and post-processing the output, enabling the ML model to handle the bulk of the computation. This division of responsibilities significantly reduces latency, enhances efficiency, and ensures cost-effective execution of user instructions.

It may be noted that the system is scalable and does not require any human intervention at any step of the process. If the system requires human oversight or manual intervention during the model training, monitoring, or deployment stages, it would not be practical or scalable for large-scale applications. However, the system leverages the low cost of ML models, allowing the system to spin up and train hundreds of models cheaply without manual involvement. For instance, each LLM call for this use case costs approximately 3 cents, while the cost to train and run ML models for tasks like text classification or topic extraction is a fraction of that. This makes the approach highly cost-effective, as it is possible to train and run hundreds of Latent Dirichlet Allocation (LDA) models for a fraction of the cost of a single LLM call. In an embodiment, the LLM creates a batch of 100 models, each initialized with slightly different seed parameters. These models are then run in parallel with the LLM processing the data. The system evaluates each model's performance and selects the one that performs best. If none of the models meet the desired performance threshold, all are discarded, and the process can start again. This method essentially allows the LLM to deploy and manage multiple models automatically, without human intervention, making the process scalable. This approach is akin to a modern-day genetic algorithm, where the system evolves by testing different models, selecting the best-performing ones, and discarding the underperformers-something that was once impractical due to the lack of reliable and cost-effective ways to obtain optimal datasets, but now made feasible with today's advances in machine learning and data availability.

Figure 2:
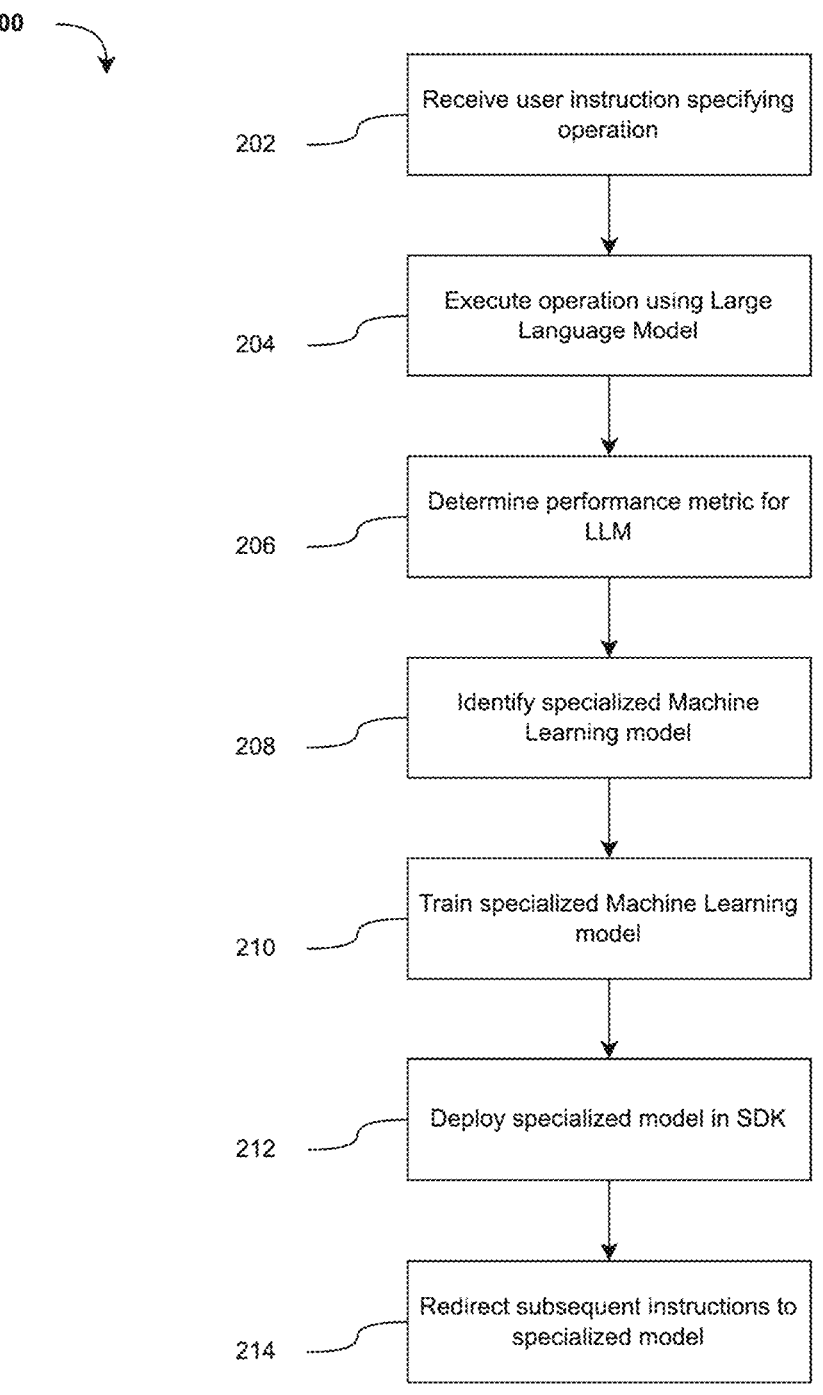
FIG. 2 illustrates a flowchart of a method for transitioning from a large language model to a specialized machine learning model, according to aspects of the present disclosure.

FIG. 2 illustrates a flowchart of a method 200 for transitioning from a Large Language Model to a specialized Machine Learning model. The method 200 comprises a series of steps that outline the process of receiving user instructions, executing operations using a Large Language Model, evaluating performance, and transitioning to a specialized Machine Learning model.

The method 200 begins with a step 202, where a user instruction specifying an operation is received. In some cases, the process may include parsing and validation of the request, checking against the system's security and validity constraints before forwarding to the Large Language Model.

Following the receipt of the user instruction, the method 200 proceeds to a step 204, where the operation is executed using a Large Language Model. The Large Language Model may analyze the user instruction to generate an output that guides the execution of the operation.

After the execution of the operation, the method 200 moves to a step 206, where a performance metric for the Large Language Model is determined. This step may involve evaluating various aspects of the Large Language Model's performance, such as accuracy, latency, or resource utilization.

Based on the performance evaluation, the method 200 continues to a step 208, where a specialized Machine Learning model is identified. This step may involve selecting a model architecture or type that is well-suited for the specific operation or task.

Once a suitable specialized model is identified, the method 200 proceeds to a step 210, where the specialized Machine Learning model is trained. The training process may utilize data collected from previous executions of the operation by the Large Language Model.

After the training is complete, the method 200 moves to a step 212, where the specialized model is deployed in a Software Development Kit (SDK). This deployment step may involve integrating the trained model into the existing system infrastructure.

The method 200 concludes with a step 214, where subsequent instructions are redirected to the specialized model. This final step ensures that future operations of the same type are handled by the more efficient specialized Machine Learning model rather than the fine-tuned domain specific Large Language Model.

Figure 3:
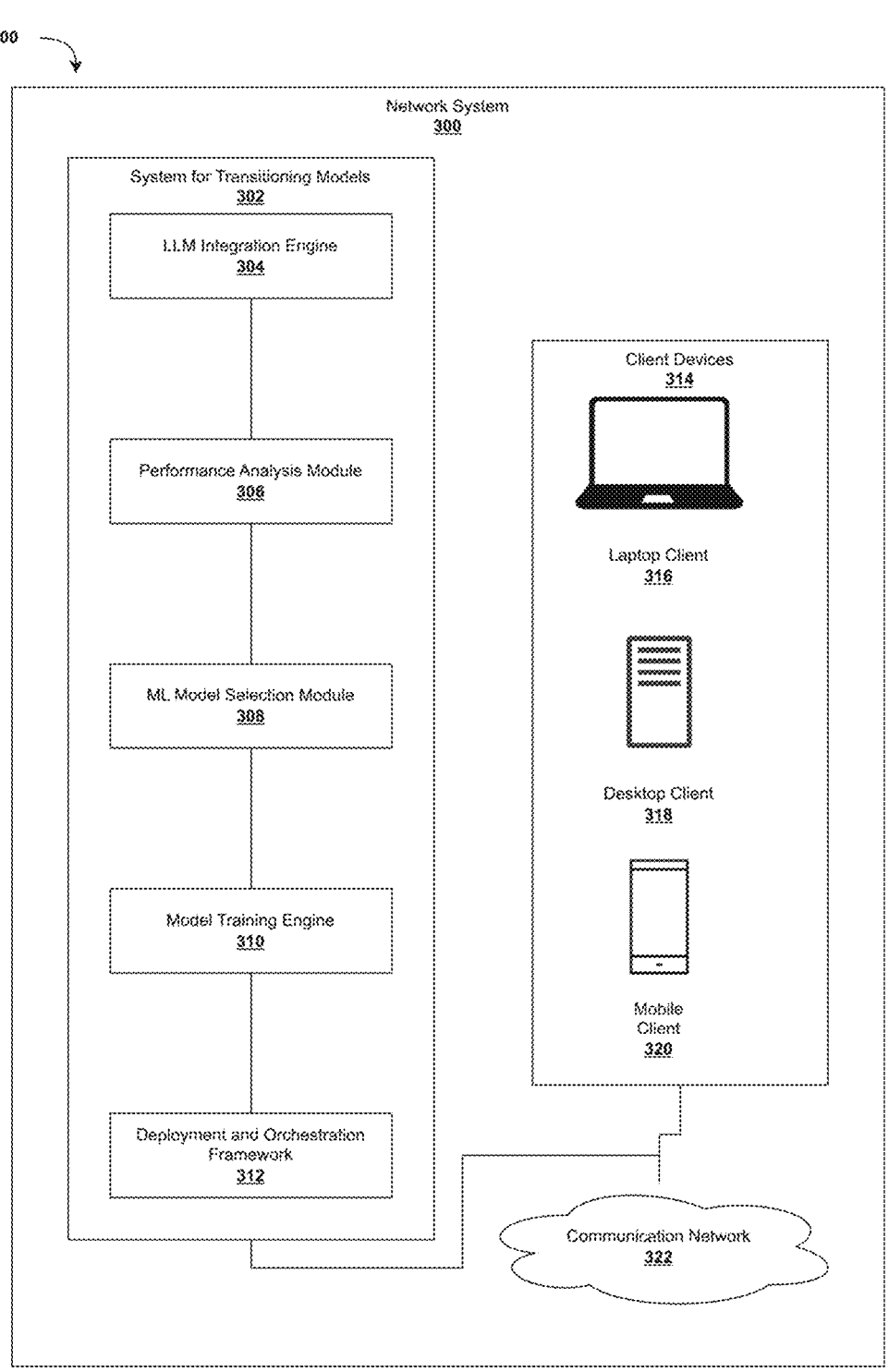
FIG. 3 illustrates a network system including a model transition system and client devices connected through a communication network, according to aspects of the present disclosure.

FIG. 3 illustrates a network system 300 that includes a model transition system 302 and client devices 314 connected through a communication network 322. The network system 300 may facilitate the transition from a Large Language Model to specialized Machine Learning models for executing operations within applications.

The model transition system 302 comprises several interconnected components that work together to analyze, select, train, and deploy specialized Machine Learning models. These components include a LLM integration engine 304, a performance analysis module 306, a ML model selection module 308, a model training engine 310, and a deployment orchestration framework 312.

The LLM integration engine 304 may serve as the initial interface for processing user instructions. In some cases, the LLM integration engine 304 may receive user requests, process them using a fine-tuned domain specific Large Language Model, and orchestrate corresponding API calls and workflows within the target application.

Connected to the LLM integration engine 304 is a performance analysis module 306. The performance analysis module 306 may monitor outputs generated by the Large Language Model over a predefined operational window. In some cases, the performance analysis module 306 may collect metrics such as accuracy, response time, and resource utilization.

Following the performance analysis module 306 is a ML model selection module 308. The ML model selection module 308 may evaluate the data gathered by the performance analysis module 306 and identify specific subsets of the Large Language Model's tasks that are most suitable for specialized Machine Learning models.

A model training engine 310 may be connected to the ML model selection module 308. The model training engine 310 may extract historical data on user prompts, Large Language Model outputs, and corresponding API calls that were executed successfully. In some cases, the model training engine 310 may prepare training datasets specific to each workflow or API call and train the identified Machine Learning models to replicate or improve upon the Large Language Model-generated actions.

At the end of the processing pipeline is a deployment orchestration framework 312. The deployment orchestration framework 312 may manage the versioning and deployment of Machine Learning models to the production environment. In some cases, the deployment orchestration framework 312 may monitor model performance post-deployment and automatically route new API calls to the deployed Machine Learning models once confidence thresholds are met.

The model transition system 302 may interact with various client devices 314 through the communication network 322. The client devices 314 may include a laptop client 316, a desktop client 318, and a mobile client 320. These client devices may send user instructions to the model transition system 302 and receive responses based on the outputs of either the Large Language Model or the specialized Machine Learning models, depending on the stage of the transition process.

The communication network 322 may serve as the medium through which the model transition system 302 and the client devices 314 exchange data. In some cases, the communication network 322 may be a wide area network, such as the internet, or a local area network, depending on the specific implementation of the network system 300.

Figure 4:
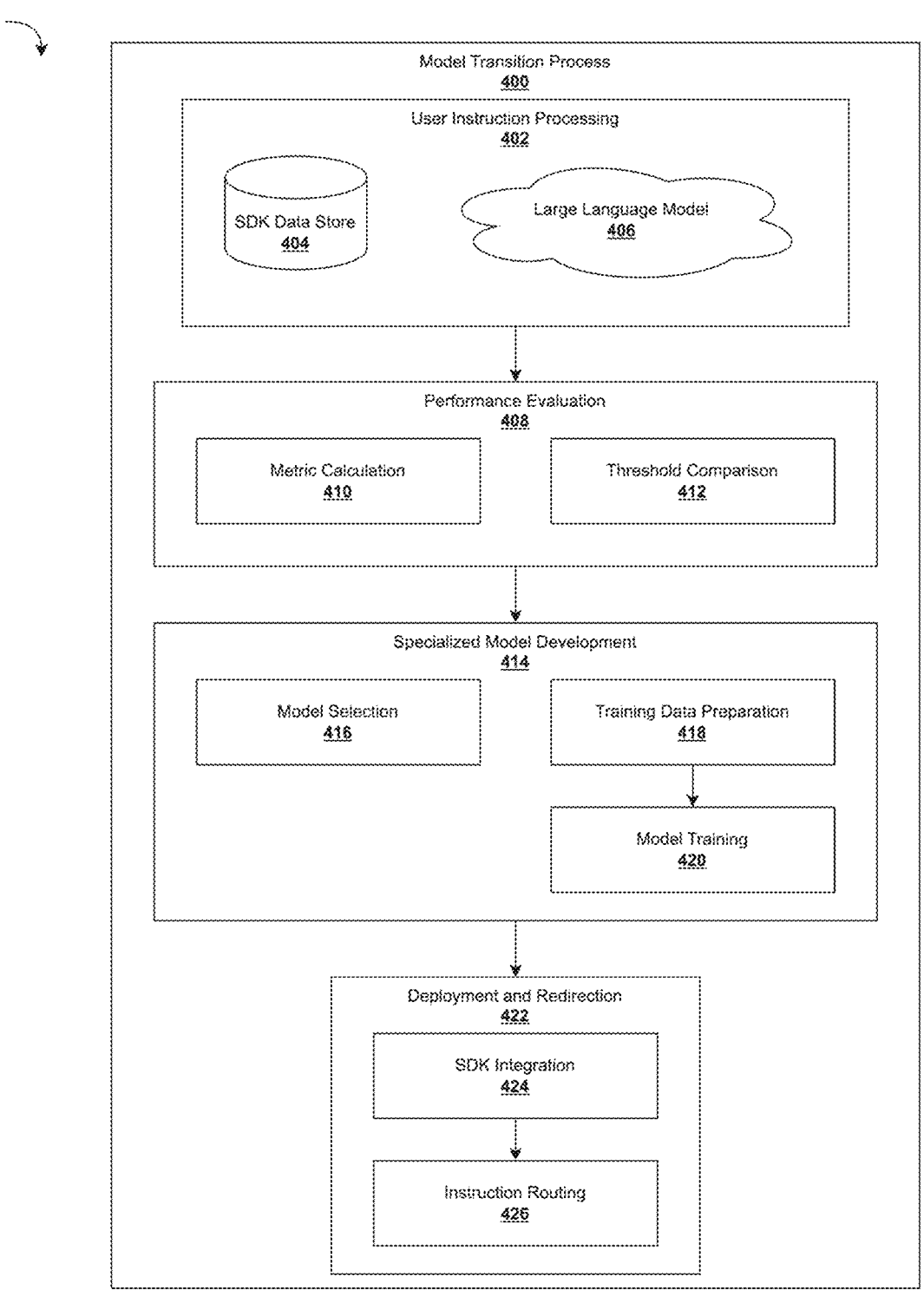
FIG. 4 illustrates a model transition process for transitioning between language models and specialized machine learning models, according to aspects of the present disclosure.

FIG. 4 illustrates a model transition process 400 for transitioning between language models and specialized machine learning models. The process 400 comprises several phases, each containing specific components that contribute to the overall transition from a Large Language Model to specialized Machine Learning models.

The process 400 begins with a user instruction processing step 402. The user instruction processing step 402 includes two components: an SDK data store 404 and a large language model 406. In some cases, the SDK data store 404 may contain information about the set of operations supported by the application, while the large language model 406 may analyze the user instruction to generate an output for executing the operation.

Following the user instruction processing step 402, the process 400 proceeds to a performance evaluation step 408. The performance evaluation step 408 comprises two components: a metric calculation step 410 and a threshold comparison step 412. The performance analysis module 306 may maintain a performance repository that logs user prompts, Large Language Model outputs, and final actions triggered in the target application. In some cases, the metric calculation step 410 may involve calculating performance metrics such as precision, recall, success ratio, or numerical error rates, depending on the nature of the tasks. The threshold comparison step 412 may compare these metrics against predefined thresholds to determine if a transition to a specialized model is warranted.

The process 400 then moves to a specialized model development step 414, which includes multiple components arranged in sequence. The first component is a model selection step 416, followed by a training data preparation step 418, which leads to a model training step 420. During the model selection step 416, the ml model selection module 308 may use the Large Language Model's own interpretive capabilities (e.g., meta-learning or zero-shot analysis) to assess Machine Learning model architectures or hyperparameters likely to excel in replicating specific workflows.

In the training data preparation step 418, the model training engine 310 may create custom features or embeddings for each workflow type during feature engineering. The model training step 420 may involve the model training engine 310 employing data augmentation techniques and cross-validation processes for robust model creation.

The final phase of the process 400 is a deployment and redirection step 422. This phase contains two sequential steps: an SDK integration step 424, followed by an instruction routing step 426. The SDK integration step 424 may involve integrating the trained specialized Machine Learning model into the Software Development Kit, while the instruction routing step 426 may involve redirecting subsequent user instructions to the newly deployed specialized model instead of the Large Language Model.

Throughout the process 400, the performance analysis module 306 may continuously monitor and evaluate the performance of both the Large Language Model and the specialized Machine Learning models. This ongoing analysis ensures that the system maintains optimal performance and efficiency in handling user instructions and executing operations within the application.

Figure 5:
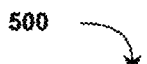
FIG. 5 illustrates a performance comparison chart showing accuracy, latency, and resource usage for a large language model and a specialized machine learning model, according to aspects of the present disclosure.
Figure 5:
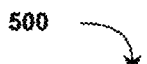

FIG. 5 illustrates a performance comparison chart showing the relationship between accuracy and latency for a Large Language Model (LLM) and a Specialized ML model. The chart provides a visual representation of how these two types of models perform in terms of accuracy, latency, and resource usage.

In the accuracy-latency plot of FIG. 5, the Large Language Model is positioned higher and further to the right compared to the Specialized ML model. This positioning indicates that the Large Language Model generally achieves higher accuracy in its outputs, but at the cost of increased latency. The Specialized ML model, while showing slightly lower accuracy, demonstrates significantly reduced latency. Further, it may be noted that the Specialized ML model when used continuously over a period may improve its accuracy when compared to the LLM.

The resource usage axis extending horizontally below the main plot in FIG. 5 provides additional context for comparing the computational requirements of both models. This axis may represent factors such as memory consumption, processing power, or energy usage. The positioning of the models on this axis suggests that the Specialized ML model typically requires fewer resources to operate compared to the Large Language Model.

The performance characteristics illustrated in FIG. 5 may have important implications for the deployment and use of these models in real-world applications. In some cases, the system may deploy the new Specialized ML model in a staging environment to validate its real-world performance on a partial set of live requests. This approach allows for a controlled evaluation of the model's performance before full production release.

The chart in FIG. 5 may be used to inform decisions about when to transition from the Large Language Model to the Specialized ML model for specific tasks. In some cases, the deployment orchestration framework may automatically route new API calls to the deployed Specialized ML models once confidence thresholds are met. These thresholds may be based on a combination of factors including accuracy, latency, and resource usage as depicted in FIG. 5.

The performance comparison illustrated in FIG. 5 may help in balancing trade-offs between accuracy, speed, and resource efficiency. While the Large Language Model may offer higher accuracy, the Specialized ML model's lower latency and reduced resource usage may make it more suitable for certain high-volume or time-sensitive tasks. The specific requirements of the application and the nature of the tasks being performed may determine which model is most appropriate in different scenarios.

A number of implementations have been described. Nevertheless, it will be understood that various modifications may be made without departing from the spirit and scope of the disclosure. Accordingly, other implementations are within the scope of the following claims.

The invention claimed is:

1. A computer-implemented method for reducing latency and improving repeatability in executing a set of operations within an application, the method comprising:

receiving an input dataset comprising relationships between initial user instructions and corresponding outputs generated by a Large Language Model (LLM), and results of executing the outputs on the application, wherein the input dataset is gathered during processing of the initial user instructions by the LLM to generate outputs that cause the application to execute the set of operations;

identifying, from a plurality of pre-stored Machine Learning (ML) models, an ML model configured to replicate outputs generated by the LLM that cause the application to execute the set of operations;

training the ML model using one or more portions of the input dataset, wherein the training is configured to enable the ML model to map user instructions to corresponding application programming interface (API) calls or parameter sets for performing the set of operations on the application;

processing, in parallel, a subsequent first set of user instructions associated with the set of operations:

(i) using the LLM to generate a first output corresponding to each user instruction of the subsequent first set of user instructions; and (ii) using the trained ML model to generate a second output corresponding to each user instruction of the subsequent first set of user instructions;

determining an accuracy metric of the ML model comprising an error rate and a computational resource utilization associated with the first output and the second output over a predefined period, wherein the error rate is calculated as a ratio of a number of the subsequent first set of user instructions for which an output generated by the ML model differs from a corresponding output generated by the LLM to a total number of the subsequent first set of user instructions; and wherein the computational resource utilization is a resource utilization associated with generation of the first output and the second output;

retraining the ML model in response to the accuracy metric of the ML model failing to satisfy a predefined accuracy threshold;

offloading a processing load for a subsequent second set of user instructions, associated with the set of operations, from the LLM to the ML model in response to the accuracy metric of the ML model satisfying the predefined accuracy threshold, wherein the offloading comprises routing execution of one or more repeatable set of operations to the ML model from the LLM, thereby reducing computational load on the LLM, improving output repeatability, and reducing latency for performing a specific operation within the application.

2. The method of claim 1, wherein identifying the ML model further comprising initializing the ML model for a specific operation by seeding random sets of weights to its parameters, thereby creating a plurality of candidate ML model instances.

3. The method of claim 1, wherein each pre-stored model of the plurality of pre-stored ML models is associated with a distinct set of operational capabilities.

4. The method of claim 1, wherein the input dataset comprises the initial user instructions for the set of operations supported by the application, the corresponding outputs generated by the LLM, each output of the corresponding outputs comprising an API call or a parameter set for performing the set of operations on the application executing a respective operation, and a result of executing each of the set of operations on the application based on an LLM generated output.

5. The method of claim 1, wherein training the ML model uses stored data to replicate an operation performed by the LLM, wherein training the ML model further comprises:

simultaneously processing the subsequent second set of user instructions with both the LLM and the ML model, initially using an output from the LLM and discarding an output from the ML model, as the ML model exhibits an accuracy metric being higher than the predefined accuracy threshold during deployment stages.

6. The method of claim 1, wherein training the ML model further comprises:

applying an optimization algorithm to minimize an operation-specific loss function, wherein the optimization algorithm iteratively updates ML model parameters using batches of labeled data;

validating an ML model performance against at least one subset of stored data to measure accuracy in replicating operation performed by the LLM; and refining at least one hyperparameter of the ML model using a hyperparameter search process that utilizes performance metrics from validation subset.

7. The method of claim 1, wherein performing hyperparameter tuning includes receiving a recommendation from the LLM regarding a hyperparameter value, and validating the recommendation using a performance metric derived from a validation subset.

8. The method of claim 1, wherein deploying the ML model in a Software Development Kit (SDK) comprises providing a containerized instance of the ML model and configuring a runtime environment to handle the subsequent second set of user instructions without invoking the LLM.

9. A system for reducing latency and improving repeatability in executing a set of operations within an application, the system comprising:

a memory storing one or more instructions; and a processor coupled to the memory, wherein the processor is configured to execute the one or more instructions for:

receiving an input dataset comprising relationships between initial user instructions and corresponding outputs generated by a Large Language Model (LLM), and results of executing the outputs on the application, wherein the input dataset is gathered during processing of the initial user instructions by the LLM to generate outputs that cause the application to execute the set of operations;

identifying, from a plurality of pre-stored Machine Learning (ML) models, an ML model configured to replicate outputs generated by the LLM that cause the application to execute the set of operations;

training the ML model using one or more portions of the input dataset, wherein the training is configured to enable the ML model to map user instructions to corresponding application programming interface (API) calls or parameter sets for performing the set of operations on the application;

processing, in parallel, a subsequent first set of user instructions associated with the set of operations:

(i) using the LLM to generate a first output corresponding to each user instruction of the subsequent first set of user instructions; and (ii) using the trained ML model to generate a second output corresponding to each user instruction of the subsequent first set of user instructions;

determining an accuracy metric of the ML model comprising an error rate and a computational resource utilization associated with the first output and the second output over a predefined period, wherein the error rate is calculated as a ratio of a number of the subsequent first set of user instructions for which an output generated by the ML model differs from a corresponding output generated by the LLM to a total number of the subsequent first set of user instructions; and wherein the computational resource utilization is a resource utilization associated with generation of the first output and the second output;

retraining the ML model in response to the accuracy metric of the ML model failing to satisfy a predefined accuracy threshold;

offloading a processing load for a subsequent second set of user instructions, associated with the set of operations, from the LLM to the ML model in response to the accuracy metric of the ML model satisfying the predefined accuracy threshold, wherein the offloading comprises routing execution of one or more repeatable set of operations to the ML model from the LLM, thereby reducing computational load on the LLM, improving output repeatability, and reducing latency for performing a specific operation within the application.

10. The system of claim 9, wherein identifying the ML model further comprising initializing the ML model for a specific operation by seeding random sets of weights to its parameters, thereby creating a plurality of candidate ML model instances.

11. The system of claim 9, wherein each pre-stored ML model of the plurality of pre-stored ML models is associated with a distinct set of operational capabilities.

12. The system of claim 9, wherein the input dataset comprises the initial user instructions for the set of operations supported by the application, the corresponding outputs generated by the LLM, each output of the corresponding outputs comprising an API call or a parameter set for performing the set of operations on the application executing a respective operation, and a result of executing each of the set of operations on the application based on an LLM generated output.

13. The system of claim 9, wherein training the ML model uses stored data to replicate an operation performed by the LLM, wherein training the ML model further comprises:

simultaneously processing the subsequent second set of user instructions with both the LLM and the ML model, initially using an output from the LLM and discarding an output from the ML model, as the ML model exhibits an accuracy metric being higher than the predefined accuracy threshold during deployment stages.

14. The system of claim 9, wherein training the ML model further comprises:

applying an optimization algorithm to minimize an operation-specific loss function, wherein the optimization algorithm iteratively updates ML model parameters using batches of labeled data;

validating an ML model performance against at least one subset of stored data to measure accuracy in replicating operation performed by the LLM; and refining at least one hyperparameter of the ML model using a hyperparameter search process that utilizes performance metrics from validation subset.

15. The system of claim 9, wherein performing hyperparameter tuning includes receiving a recommendation from the LLM regarding a hyperparameter value, and validating the recommendation using a performance metric derived from a validation subset.

16. The system of claim 9, wherein deploying the ML model in a Software Development Kit (SDK) comprises providing a containerized instance of the ML model and configuring a runtime environment to handle incoming user instructions without invoking the LLM.

* * * * *